MICROWAVE CIRCUIT WITH COAXIAL PACKAGE SEMICONDUCTOR DEVICE

Filed Dec. 24, 1968

INVENTORS
HON C. LEE &
BY GREGORY HODOWANEC

W. S. Hill
Agent

United States Patent Office 3,517,272
Patented June 23, 1970

3,517,272

MICROWAVE CIRCUIT WITH COAXIAL PACKAGE SEMICONDUCTOR DEVICE

Hon Chiu Lee, Cranford, and Gregory Hodowanec, Newark, N.J., assignors to RCA Corporation, a corporation of Delaware Filed Dec. 24, 1968, Ser. No. 786,589
Int. Cl. H01n *3/08;* H02b *1/00;* H05k *1/16*
U.S. Cl. 317—101 3 Claims

ABSTRACT OF THE DISCLOSURE

In a microwave circuit which comprises a metal plate with a plurality of microstrip or stripline circuit portions mounted thereon, means including a ceramic washer inserted in the plate for mounting a coaxial package transistor in the circuit.

BACKGROUND OF THE INVENTION

Figure 1:
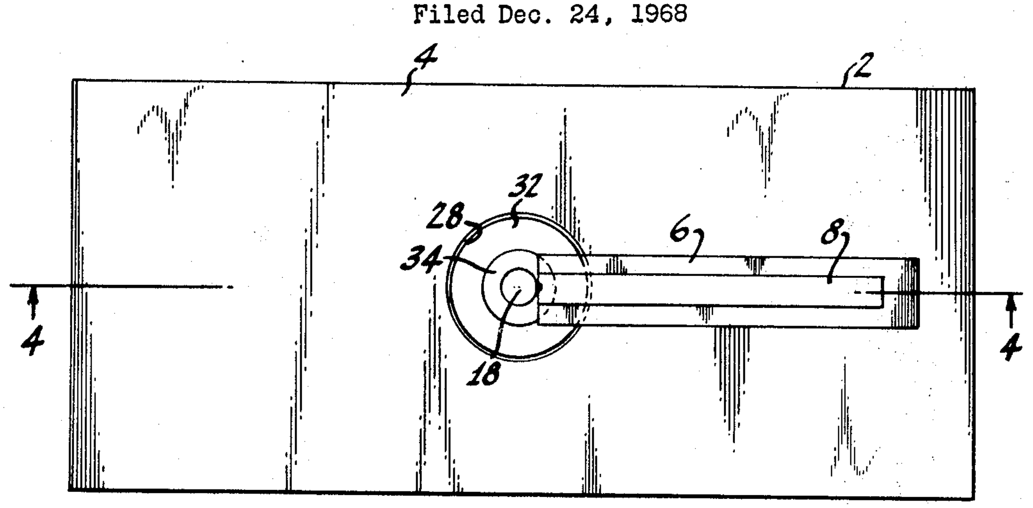

It has generally been recognized that, at microwave frequencies, a well-designed coaxial transistor outperforms transistors in other packages, such as molded plastic packages, hermetic ceramic-metal stripline types, and can-on-header types.

The superiority of performance of the coaxial package device is due to the low values of parasitic capacitance and inductance associated with the device and to the excellent isolation between input and output circuits, which is possible with the coaxial configuration.

Coaxial packages are intended for and are readily connected into coaxial line circuits. However, it is often more desirable to use other types of microwave circuits in a particular application. These other types of circuits include lumped-constant, microstrip and stripline types for which the transistor package types listed above, other than the coaxial type, are more readily adaptable.

SUMMARY OF THE INVENTION

The invention comprises an improved microwave circuit which includes a metal plate having two opposed surfaces, each of which has at least one segment of a microwave transmission line comprising a strip of thin metal sheet material laminated to a sheet of dielectric material. Where microstrip transmission lines are used, the surfaces of the plate serve as ground planes for the transmission lines. Where stripline circuits are used, the ground planes are metal strips laminated to the opposite surfaces of the sheet of dielectric material.

The metal plate has means for mounting coaxial device package therein so that the terminals of the device are connected to the transmission line segments. This means comprises an aperture extending through the plate and a ceramic washer having good dielectric properties and good heat conducting properties seated within the aperture. The coaxial package device is mounted within the washer opening.

THE DRAWING

Figure 2:
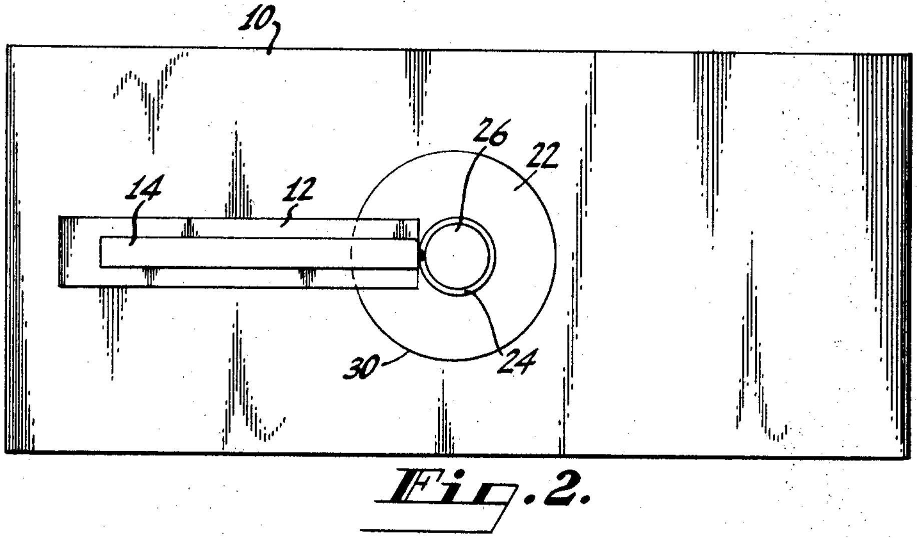
Figure 4:
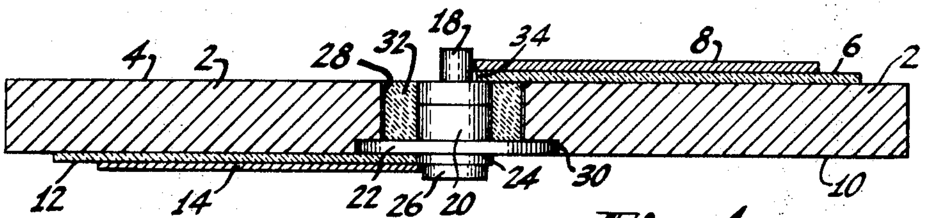
Figure 3:
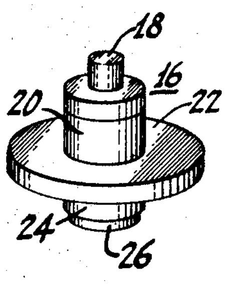

FIG. 1 is a top plan view of part of a microcircuit constructed in accordance with the present invention, FIG. 2 is a bottom plan view of the circuit of FIG. 1, FIG. 3 is a perspective view of a coaxial package transistor, and FIG. 4 is a view, partly in section, taken along the line 4—4 of FIG. 1.

DESCRIPTION OF PREFERRED EMBODIMENT

FIGS. 1, 2 and 4 of the drawing show how the invention may be embodied in a typical microwave amplifier circuit.

The circuit may comprise a relatively thin metal plate 2 having a top surface 4 which serves as a support for a thin strip of dielectric material 6. The dielectric material may be Teflon-fiberglass or a suitable synthetic resinous material. Laminated to the top surface of the dielectric strip 6 is a strip of metal foil 8. The combination of the top surface 4 of the metal plate, the dielectric strip 6 and the metal strip 8 comprises a microstrip output portion of the amplifier circuit. The top surface of the metal plate 2 functions as a ground plane for this portion of the circuit.

The bottom surface 10 of the metal plate 2 carries an input portion of the microwave amplifier circuit. Like the output portion of the circuit described above, the input portion comprises a strip of dielectric material 12 adhered to the metal surface 10 and a strip of metal foil 14 adhered to the dielectric strip 12. The bottom surface 10 of the metal plate functions as a ground plane for the input circuit portion.

Preferably, the input and output portions of the microwave circuit extend in opposite directions across the metal plate 2 to reduce coupling effects.

A typical coaxial transistor package which is to be mounted in the microstrip circuit which has been described, is shown in FIG. 3. The package 16 houses a transistor (not shown) with emitter, base and collector electrodes. The encapsulating package includes a top metal stud 18 which is connected to the collector electrode of the transistor. The metal stud 18 is sealed to a first ceramic sleeve 20 which insulates the collector electrode from the base electrode connection. Sealed to the bottom of the ceramic sleeve is a metal flange 22 which is connected within the package to the base electrode of the transistor. A second ceramic sleeve 24 is sealed to the bottom surface of the flange 22. This second ceramic sleeve insulates the base electrode connection from the emitter electrode connection. Sealed to the bottom of the second ceramic sleeve 24 is a metal cap 26 which is connected to the emitter electrode of the transistor.

In order to mount the transistor 16 so that it can be connected to the input and output portions of the microcircuit, a circular aperture 28 is provided in the metal plate 2 extending between the upper surface 4 and the lower surface 10. The aperture 28 is of stepped configuration with a lower portion 30 wider in diameter than the upper portion. The portion 30 is made just wide enough to accommodate the transistor package flange 22.

Seated within the upper portion of the aperture 28 is a ceramic washer 32 having a central opening 34 large enough to accommodate the lower wide-diameter part of the metal collector stud 18 and the ceramic portion 20 of the transistor package. The ceramic washer 32 is made of a material such as beryllium oxide or boron nitride which has both good heat conducting and good dielectric properties. A suitable size for the washer 32 is that the difference between its inner and outer diameters shall be about one-half the corresponding dimension of the flange 22 but the optimum size is selected in a manner to be pointed out later.

The transistor 16 is connected into the microcircuit by, first, seating the coaxial package within the central opening 34 of the ceramic washer 32 with the collector stud 18 projecting upward and the flange 22 fitted snugly within the wide portion 30 of the aperture. The metal strip 8 of the output portion of the circuit is soldered to the collector stud 18. The metal strip 14 of the input portion of the circuit is soldered to the emitter cap 26. The flange 22 makes electrical contact to the metal plate 2.

In deciding what diameter ceramic washer to use, consideration must be given to the impedance of the output stripline circuit which is to be used and to the diameter of the collector stud of the transistor to be inserted in the washer. The large diameter portion of collector stud 18 and the inner surface of the aperture 28 together constitute a short section of coaxial line. The impedance of this section of line should be made about equal to the impedance of the output circuit. The ratio of diameters of the ceramic washer 32 and of the large diameter portion of the stud 18 should thus be chosen to give the proper impedance.

With the arrangement which has been described, a coaxial package is adapted to be used with stripline or microstrip circuits in a manner such that good heat-conducting conditions are provided. The ceramic washer and metal plate dissipate heat rapidly from the transistor. And, since the input and output circuit portions can be widely separated, interaction effects are minimized.

What is claimed is:

1. A microwave electronic circuit comprising a metal plate having opposed surfaces, microwave transmission lines comprising thin metal sheet material and dielectric sheet material laminated together and being mounted on said opposed surfaces, means in said plate for mounting a coaxial package device therein, said means comprising an aperture extending through said plate between said opposed surfaces, a cylindrical washer seated in said aperture, said washer being composed of a ceramic material having both good dielectric properties and good heat conducting properties, said washer having a central opening adapted to receive said device, said transmission lines each being postioned such that they are adapted to have one end connected to opposite terminals of said device.

2. A microwave electronic circuit comprising a relatively thin metal plate having two opposed surfaces, segments of microwave transmission line each comprising a strip of thin metal sheet material and a sheet of dielectric material laminated together, at least one of said transmission lines being mounted on each of said surfaces, means in said plate for mounting a coaxial package device therein with terminals connected to said transmission lines, said means comprising an aperture extending through said plate and a washer made of a ceramic material having both good dielectric properties and good heat condutcing properties, seated within said aperture, said washer having a central opening, a coaxial package device mounted within said washer opening, said device having terminals at opposite ends, and means electrically connecting said transmission lines to said terminals.

3. A microwave circuit according to claim 2 in which said ceramic washer is made of beryllium oxide.

References Cited

UNITED STATES PATENTS

| | | |
|---|---|---|
| 2,862,992 | 12/1958 | Franz. |
| 3,149,265 | 9/1964 | Thorn. |
| 3,266,125 | 8/1966 | Tobolski. |
| 3,373,318 | 3/1968 | Rogers. |

ROBERT K. SCHAEFER, Primary Examiner

J. R. SCOTT, Assistant Examiner

U.S. Cl. X.R.

317—100; 333—84